US011922828B2

(12) United States Patent
Carsello et al.

(10) Patent No.: US 11,922,828 B2
(45) Date of Patent: Mar. 5, 2024

(54) GREETING DEVICES FOR PRESENTING A MEDIA ITEM AND ASSOCIATED METHODS FOR MANUFACTURING SUCH DEVICES

(71) Applicant: FUNKO, LLC, Everett, WA (US)

(72) Inventors: Thomas M. Carsello, Seattle, WA (US); Brian R. Mariotti, Coronado, CA (US)

(73) Assignee: Funko, LLC, Everett, WA (US)

( * ) Notice: Subject to any disclaimer, the term of this patent is extended or adjusted under 35 U.S.C. 154(b) by 0 days.

(21) Appl. No.: 17/941,504

(22) Filed: Sep. 9, 2022

(65) Prior Publication Data

US 2023/0073164 A1 Mar. 9, 2023

Related U.S. Application Data

(60) Provisional application No. 63/242,293, filed on Sep. 9, 2021.

(51) Int. Cl.
*G09F 1/08* (2006.01)
*B42D 15/02* (2006.01)

(52) U.S. Cl.
CPC .................................... *G09F 1/08* (2013.01)

(58) Field of Classification Search
CPC .. G09F 1/08; G09F 1/06; B42D 15/02; B42D 15/027
See application file for complete search history.

(56) References Cited

U.S. PATENT DOCUMENTS 3,981,097 A * 9/1976 Bunin ..................... A63H 3/18 446/338
4,591,345 A * 5/1986 Kohner .................... A63H 3/18 446/361
8,955,240 B1 * 2/2015 Loftus ................. B42D 15/022 40/124.03
8,973,292 B1 * 3/2015 Shlonsky ............ B42D 15/027 40/124.03
9,216,608 B1 * 12/2015 Nelson ................ B42D 15/045
(Continued)

FOREIGN PATENT DOCUMENTS

CN 207856315 U 9/2008
JP 56-093291 U 7/1981

OTHER PUBLICATIONS

International Search Report and Written Opinion for PCT International Application No. PCT/US2022/043017 dated Dec. 27, 2022, 17 pages.

*Primary Examiner* — Gary C Hoge
(74) *Attorney, Agent, or Firm* — Perkins Coie LLP

(57) ABSTRACT

Greeting devices are described herein. In some embodiments, the greeting device can include an elongate body having a first end portion defining a chamber, and a second end portion opposite the first end portion. A message module can be positioned at least partially within the chamber. The greeting device can further include a first arm pivotably coupled to a first side of the body, and a second arm pivotably coupled to a second side of the body opposite the first side. An actuation mechanism can be operably coupled to the body. When actuated, the actuation mechanism can be configured to: (i) pivot the first and second arms relative to the body in a first direction toward the message module; and (ii) move the message module in a first direction from the chamber to extend at least partially beyond the body.

20 Claims, 8 Drawing Sheets

(56) References Cited

U.S. PATENT DOCUMENTS

| | | | | |
|---|---|---|---|---|
| 10,787,308 | B1 * | 9/2020 | Larson | B42D 15/045 |
| 2008/0047175 | A1 | 2/2008 | Kelley | |
| 2013/0139417 | A1 * | 6/2013 | Mayer | B42D 15/0093<br>40/124.03 |
| 2013/0232828 | A1 * | 9/2013 | Qiao | B42D 15/027<br>40/124.03 |
| 2015/0224808 | A1 | 8/2015 | Shlonsky et al. | |
| 2018/0009253 | A1 | 1/2018 | Dove et al. | |

* cited by examiner

GREETING DEVICES FOR PRESENTING A MEDIA ITEM AND ASSOCIATED METHODS FOR MANUFACTURING SUCH DEVICES

CROSS-REFERENCE TO RELATED APPLICATION(S)

The present application claims priority to U.S. Provisional Patent Application No. 63/242,293, filed Sep. 9, 2021, the disclosure of which is incorporated by reference in its entirety.

TECHNICAL FIELD

The present technology is generally related to greeting devices, and, more particularly, to greeting devices including actuation mechanisms that can be actuated to deploy a media item.

BACKGROUND

Greetings and other messages are commonly given to both children and adults on various occasions. Many greetings can be carried by a device, such as a greeting device, that can be opened or otherwise manipulated to display the greeting or message. Some greeting devices include pop-ups or other features that move when the greeting device is opened. However, such features of greeting devices are typically susceptible to failure after repeated uses, which can shorten the functional lifetime of these devices.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology. Furthermore, components can be shown as transparent in certain views for clarity of illustration only and not to indicate that the component is necessarily transparent. Components may also be shown schematically.

DETAILED DESCRIPTION

Figure 1C:
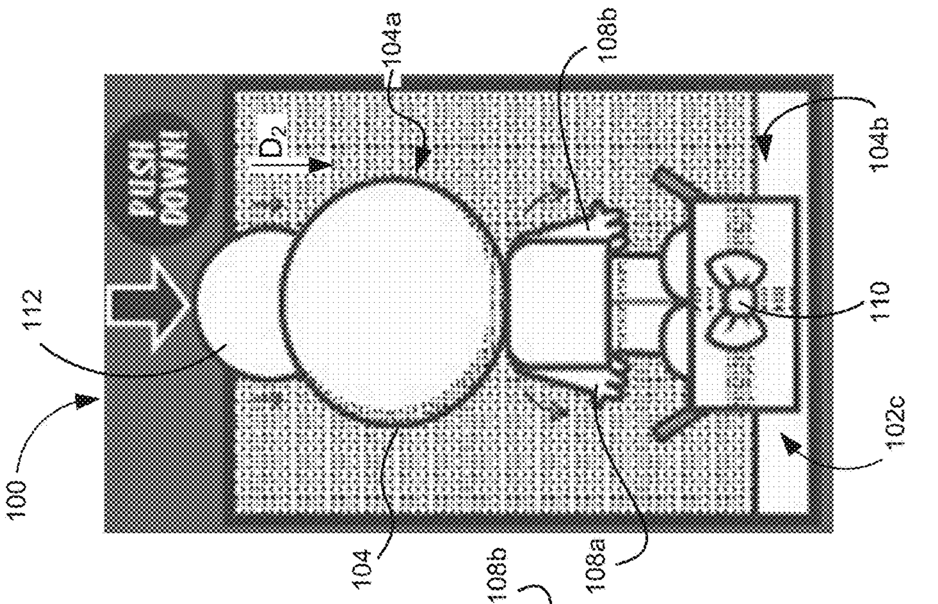
FIGS. 1A-1C are schematic illustrations of a greeting device configured in accordance with embodiments of the present technology.

The present technology is directed generally to greeting devices including actuation mechanisms that can be actuated to deploy a media item. In some embodiments, for example, a greeting device can include an elongate body having a first end portion defining a chamber, and a second end portion opposite the first end portion. A message module can be positioned at least partially within the chamber. The greeting device can further include a first arm pivotably coupled to a first side of the body, and a second arm pivotably coupled to a second side of the body opposite the first side. An actuation mechanism can be operably coupled to the body. When actuated, the actuation mechanism can be configured to: (i) pivot the first and second arms relative to the body in a first direction toward the message module and (ii) move the message module in a first direction from the chamber to extend at least partially beyond the body.

Specific details of several embodiments of the present technology are described herein with reference to FIGS. 1A-3F. The present technology, however, may be practiced without some of these specific details. In some instances, well-known structures and techniques often associated with springs, levers, fasteners, pins, pivots, etc., have not been shown in detail so as not to obscure the present technology. The terminology used in the description presented below is intended to be interpreted in its broadest reasonable manner, even though it is being used in conjunction with a detailed description of certain specific embodiments of the disclosure. Certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

Reference throughout this specification to relative terms such as, for example, “generally,” “approximately,” and “about” are used herein to mean the stated value plus or minus 10%.

The headings provided herein are for convenience only and do not interpret the scope or meaning of the claimed present technology.

A. EMBODIMENTS OF GREETING DEVICES AND ASSOCIATED METHODS OF USE AND MANUFACTURING

Figure 1B:
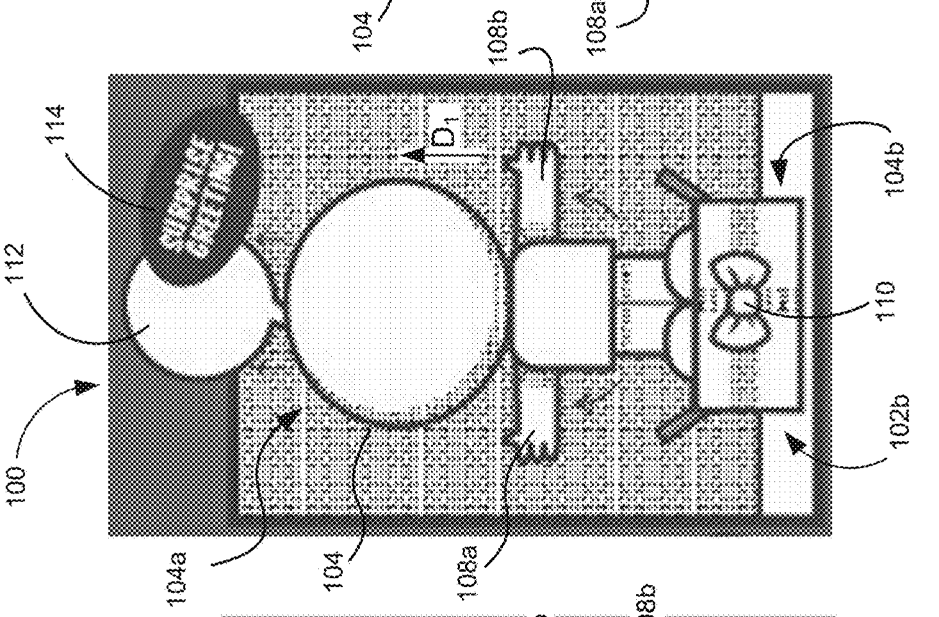
Figure 1A:
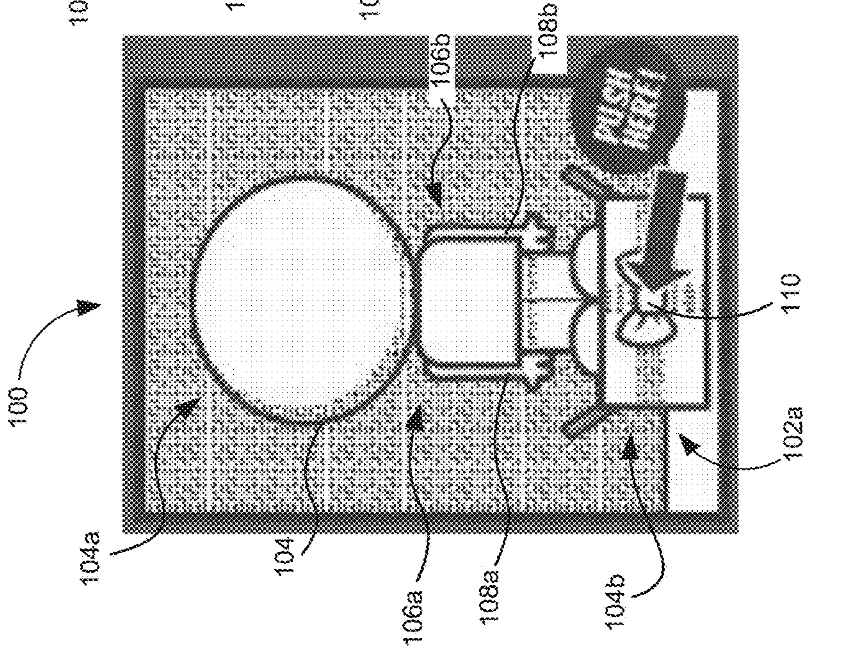

FIGS. 1A-1C are schematic illustrations of a greeting device 100 ("the device 100") configured in accordance with embodiments of the present technology. Specifically, FIG. 1A illustrates the device 100 in a first or undeployed configuration 102*a*, FIG. 1B illustrates the device 100 in a second or deployed configuration 102*b*, and FIG. 1C illustrates the device 100 in a third or intermediate configuration 102*c*. Referring to FIGS. 1A-1C together, the device 100 can include a body 104 having a first (e.g., upper) end portion 104*a* and a second (e.g., lower) end portion 104*b* opposite and/or spaced apart from the first end portion 104*a*. The body 104 can further include a first side 106*a* and a second side 106*b* opposite and/or spaced apart from the first side 106*a*. In some embodiments, the first side 106*a* can be a left side or a right side of the body 104, and the second side 106*b* can be the other of the left or right sides. The body 104 can further include one or more arms 108. In the illustrated embodiment, for example, the body 104 includes a first arm 108*a* coupled (e.g., pivotably coupled) to the first side 106*a* of the body 104, and a second arm 108*b* coupled (e.g., pivotably coupled) to the second side 106*b* of the body 104 (referred to collectively as "the arms 108").

The device 100 can further include an actuation mechanism 110 coupled (e.g., operably coupled) to the body 104. In the illustrated embodiment, for example, the actuation mechanism 110 is operably coupled to the second end portion 104*b* of the body 104. In other embodiments, however, the actuation mechanism 110 can be coupled to the first end portion 104*a*, or any other suitable portion of the body 104. The body 104 can be formed from plastics, composites, polymers, metals, a combination thereof, and/or any other suitable material. In at least some embodiments, for example, the body 104 is formed from acrylonitrile butadiene styrene (ABS), nylon, and/or polyvinyl chloride (PVC).

When actuated (e.g., by a user of the device 100), the actuation mechanism 110 is configured to transition (e.g., automatically transition) the device 100 from the first configuration 102*a* (FIG. 1A) to and/or toward the second configuration 102*b* (FIG. 1B). Referring first to FIG. 1A, in the illustrated embodiment, the actuation mechanism 110 can be actuated by pressing or pushing the actuation mechanism 110. In other embodiments, the actuation mechanism 110 can be actuated by pulling, rotating, twisting, sliding, or otherwise manipulating the actuation mechanism 110. Referring next to FIG. 1B, actuating the actuation mechanism 110 (e.g., to transition the device 100 to and/or toward the second configuration 102*b*) can include pivoting, rotating, spinning, turning, repositioning, or otherwise reorienting one or more of the arms 108 relative to the body 104. In the illustrated embodiment, for example, and as noted above, the first and second arms 108*a-b* are pivotably coupled to the respective first and second sides 106*a-b* of the body 104, and the actuation mechanism 110 is configured to pivot the first and second arms 108*a-b* in a first direction $D_1$ (e.g., an upward direction) toward the first end portion 104*a* and away from the second end portion 104*b* and/or the actuation mechanism 110. In some embodiments, the arms 108 can be configured to move concurrently and/or in concert with each other. In the illustrated embodiment, for example, the first and second arms 108*a-b* are configured to pivot a same angle and at a same time. In other embodiments, however, the arms 108 may be configured such that they do not move concurrently and/or in concert with each other (e.g., at different angles and/or at different times).

In some embodiments, when actuated, the actuation mechanism 110 can be further configured to deploy, extend, or otherwise move a sign or message module 112 ("the message module 112") relative to the body 104. Referring to FIGS. 1A and 1B, in the illustrated embodiment the device 100 includes a chamber (as shown and described in greater detail below and with reference to FIGS. 2B and 2C) at the first end portion 104*a* of the device 100. When the device 100 is in the first configuration 102*a* (FIG. 1A), the message module 112 can be positioned or stored at least partially within the chamber. When the device 100 transitions to and/or toward the second configuration 102*b* (FIG. 1B), the message module 112 can move in the first direction $D_1$ from the chamber such that the message module 112 extends at least partially beyond the chamber, the body 104, and/or the first end portion 104*a*. In some embodiments, the actuation mechanism 110 can be configured to move the message module 112 concurrently and/or in concert with one or more of the arms 108, e.g., such that one or more of the arms 108 pivots in the first direction $D_1$ at a same time as the message module 112 moves in the first direction $D_1$. In other embodiments, the actuation mechanism 110 can be configured such that the motion of the arms 108 can be time-delayed relative to the motion of the message module 112, e.g., such that the arms 108 move in response to the motion of the message module 112 and/or partially concurrently and/or partially in concert with the message module 112. The message module 112 can be configured to carry or display a media item, a message, an expression, and/or indicia 114, such as a greeting message or any other suitable message. Accordingly, when actuated (e.g., by the user), the device 100 can display the message 114 to the user.

Referring to FIG. 1C, the device 100 can be transitioned or returned from the second configuration 102*b* (FIG. 1B) to the first configuration 102*a* (FIG. 1A). Transitioning the device 100 from the second configuration 102*b* (FIG. 1B) to and/or toward the first configuration 102*a* (FIG. 1A) can be generally similar to or the same as transitioning the device 100 from the first configuration 102*a* to and/or toward the second configuration 102*b*, but in reverse. In the illustrated embodiment, for example, the message module 112 can be pressed, pushed, or otherwise moved (e.g., by the user) in a second direction $D_2$ (e.g., a downward direction) opposite the first direction $D_1$ and toward the first end portion 104*a*, such that the message module 112 is at least partially reinserted or returned to the chamber (not shown). Moving the message module 112 in the second direction $D_2$ can reset the actuation mechanism 110, such that the actuation mechanism 110 can be actuated again (e.g., re-actuated and/or repeatedly actuated), with each subsequent actuation being generally similar to or the same as the actuation described previously. In some embodiments, moving the message module 112 in the second direction $D_2$ can cause corresponding movement of the arms 108. In the illustrated embodiment, for example, moving the message module 112 in the second direction $D_2$ causes the arms 108 to pivot in the second direction $D_2$.

In some embodiments, the body 104 of the device 100 can be designed or shaped to correspond to and/or approximate the appearance of a character or media figure (e.g., a fictional character or media figure, a nonfictional character or media figure, etc.). In other embodiments, the device 100 can further include a shell or housing designed or shaped to correspond to and/or approximate the appearance of a character or media figure, and the body 104 of the device 100 can be positioned at least partially or fully within the shell.

Although the embodiments illustrated in FIGS. 1A-1C include two arms 108*a-b*, in other embodiments the device 100 can include more or fewer arms 108. In at least some embodiments, for example, the device 100 can include zero, one, three, four, five, six, seven, eight, or any other suitable number of arms 108. In at least some embodiments, such as the embodiment described below with reference to FIGS. 3A-3F, the device 100 can include one or more arms that do not move (e.g., remain stationary and/or in a first configuration) when the device 100 transitions between the first and second configurations 102*a-b*. Additionally or alternatively, although the embodiments illustrated in FIGS. 1A-1C depict the arms 108 pivoting in the first direction $D_1$ when the device 100 transitions to and/or toward the second configuration 102*b* (FIG. 1B), in other embodiments one or more of the arms 108 can be configured to pivot in the second direction $D_2$ when the device 100 transitions to and/or toward the second configuration 102*b* (FIG. 1B). The device 100 may alternatively be referred to as a greeting device, a message deployment device, or a message display device.

FIGS. 2A-2F illustrate a greeting device 200 ("the device 200") configured in accordance with embodiments of the present technology. The device 200 can be generally similar to or the same as the device 100 of FIGS. 1A-1C. Accordingly, like numbers are used to indicate like components (e.g., body 204 versus the body 104 of FIGS. 1A-1C), and the discussion of the device 200 will be limited to those aspects that differ from the device 100 of FIGS. 1A-1C and are otherwise provided for context.

Figure 2A:
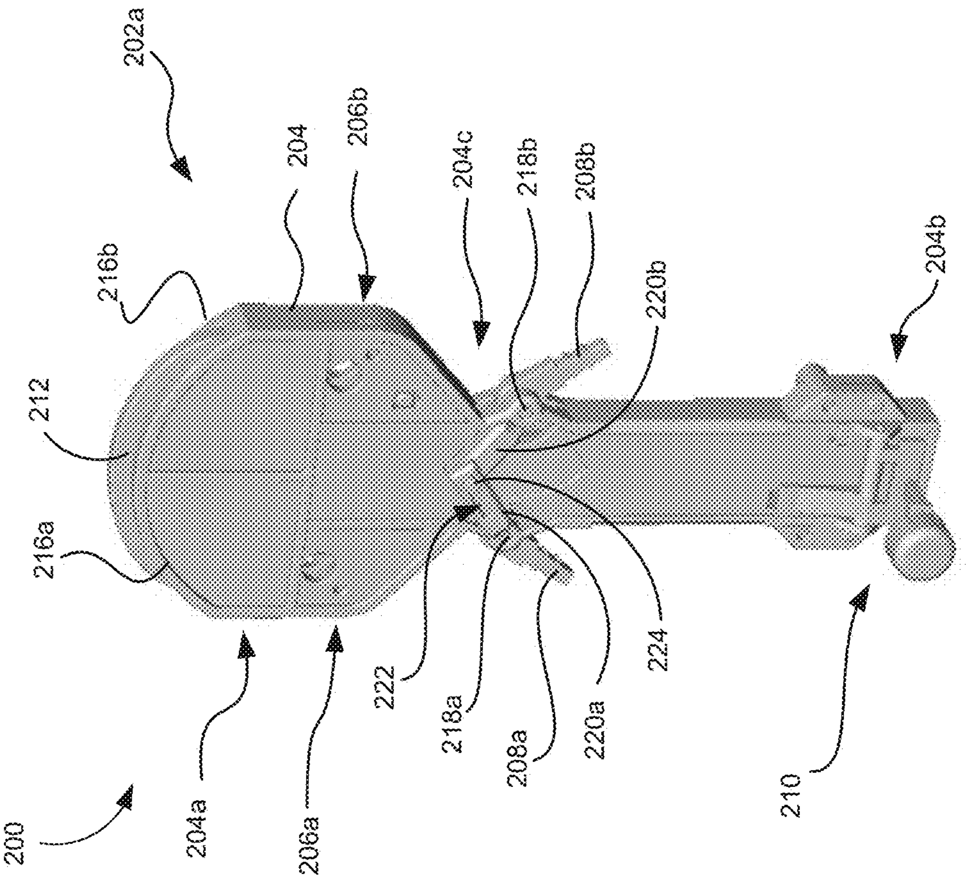
FIG. 2A illustrates a front perspective view of a greeting device, configured in accordance with an embodiment of the present technology, in a first configuration.

FIG. 2A is a front perspective view of the device 200 in a first configuration 202*a*, in accordance with embodiments of the present technology. The body 204 of the device 200 can be a multi-part assembly. In the illustrated embodiment, for example, the body 204 includes a first (e.g., front, front-side, etc.) shell or plate 216*a* ("the first plate 216*a*") and a second (e.g., rear, back, back-side, etc.) shell or plate 216*b* ("the second plate 216*b*"). The second plate 216*b* can be generally similar to or the same as the first plate 216*a*. The first plate 216*a* can be coupled to the second plate 216*b* using one or more fasteners (e.g., screws, nails, etc.), adhesives, welds (e.g., sonic welding), and/or any other suitable coupling process or technique.

The body 204 can further include an intermediate portion 204*c* between the first end portion 204*a* and the second end portion 204*b*. Each of the arms 208 can be coupled (e.g., pivotably coupled) to the intermediate portion 204*c* by a corresponding pin or pivot 218. In the illustrated embodiment, for example, the first arm 208*a* is coupled to the first side 206*a* of the intermediate portion 204*c* by a first pivot 218*a*, and the second arm 208*b* is coupled to the second side 206*b* of the intermediate portion 204*c* by a second pivot 218*b*. Each of the arms 208 can further include a corresponding arm actuator 220. In the illustrated embodiment, for example, the first arm 208*a* is coupled to a first arm actuator 220*a*, and the second arm 208*b* is coupled to a second arm actuator 220*b* ("the arm actuators 220"). The arm actuators 220 can be coupled (e.g., operably, slidably, etc.) to each other. In the illustrated embodiment, for example, the first arm actuator 220*a* includes a slot 222, the second arm actuator 220*b* includes an arm actuator pin or pivot 224 ("the arm actuator pin 224"), and the slot 222 can be configured to receive (e.g., slidably or movably receive) the arm actuator pin 224.

Figure 2C:
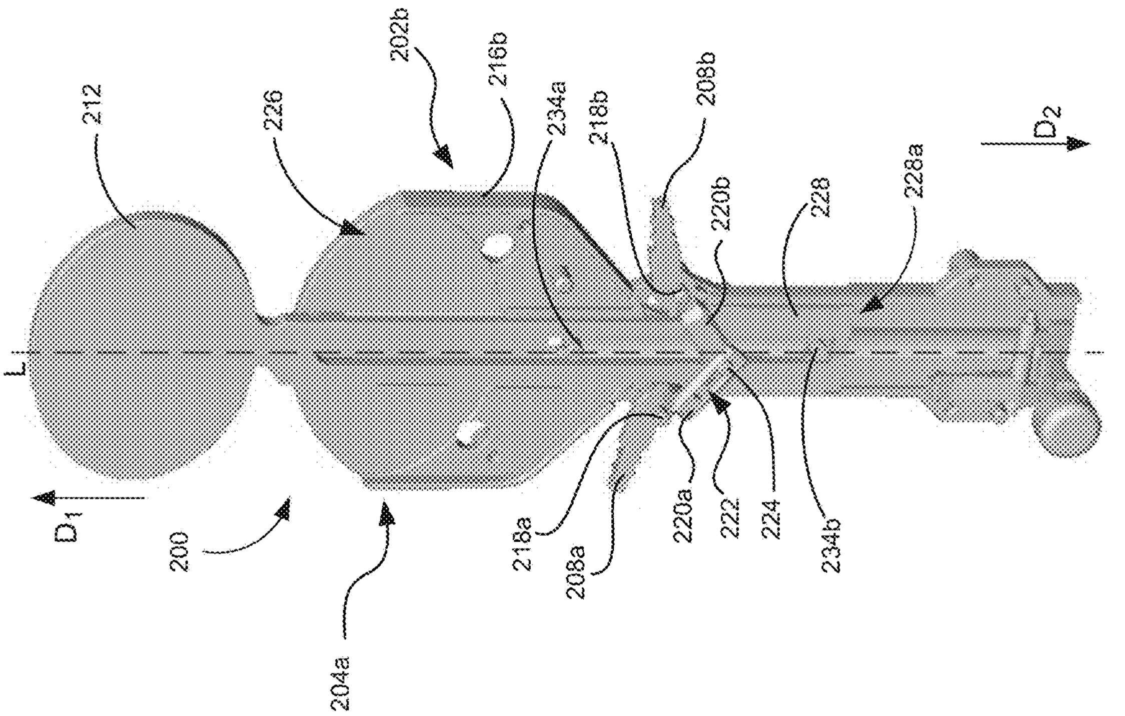
FIG. 2C illustrates a front perspective view of the greeting device of FIG. 2B in a second configuration.
Figure 2B:
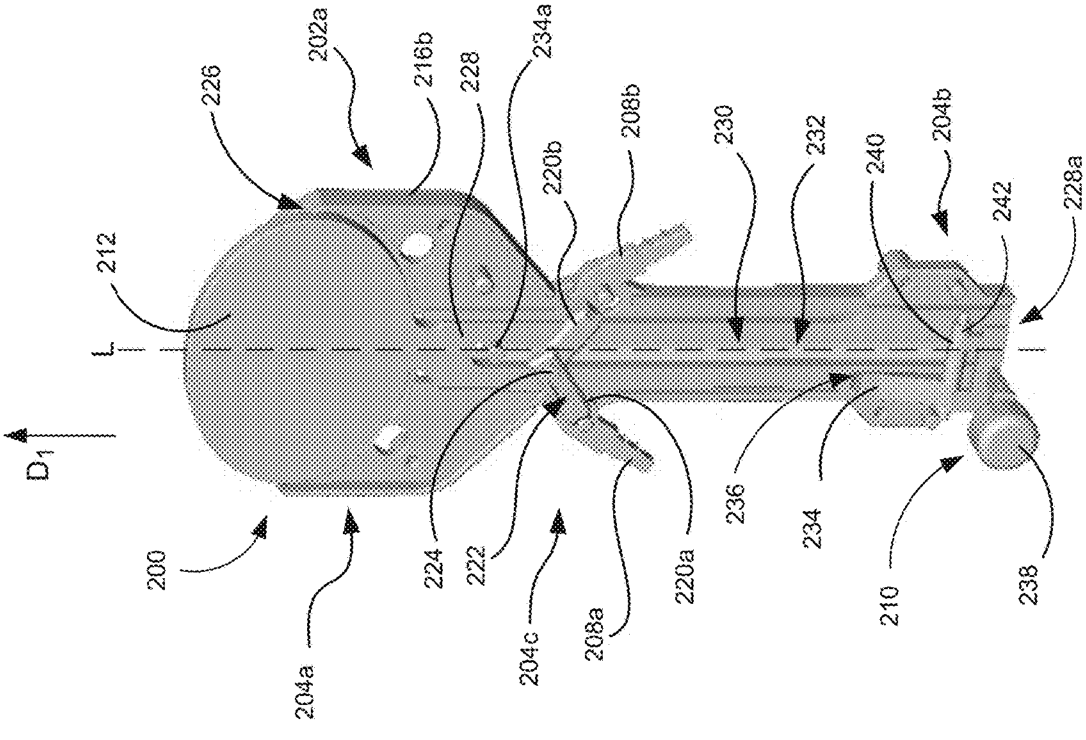
FIG. 2B illustrates a front perspective view of select aspects of the greeting device of FIG. 2A with other aspects of the device omitted for clarity.

FIGS. 2B and 2C are front perspective views of select aspects of the device 200 of FIG. 2A with other aspects of the device omitted for clarity. In particular, FIG. 2B is a front perspective view of the device 200 with the first plate 216*a* (FIG. 2A) omitted solely for the purpose of clarity, and FIG. 2C is a front perspective view of the device 200 in a second configuration 202*b*, again with the first plate 216*a* (FIG. 2A) omitted solely for the purpose of clarity.

Referring first to FIG. 2B, the device 200 can further include a chamber or opening 226. In the illustrated embodiment, the chamber 226 is positioned in and/or defined by the first end portion 204*a* of the body 204. In other embodiments, the chamber 226 can be positioned in and/or defined by the second end portion 204*b*, the intermediate portion 204*c*, and/or any other suitable portion of the body 204. The chamber 226 can be sized, dimensioned, and/or otherwise configured to receive the message module 212, as described previously. Accordingly, when the device 200 is in the first configuration 202*a*, the message module 212 can be positioned at least partially within the chamber 226.

The message module 212 can be coupled to an elongate shaft or stem 228 ("the shaft 228"), and the shaft 228 can extend to and/or toward the second end portion 204*b* of the body 204. The shaft 228 can be generally or substantially aligned with a longitudinal axis L of the body 204. The shaft 228 can include a shaft end portion 228*a* generally or substantially proximate to the second end portion 204*b* and opposite the message module 212. In some embodiments, the shaft 228 can further include a shaft slot 230 extending at least partially between the shaft end portion 228*a* and the message module 212. The shaft slot 230 can be generally or substantially aligned with the longitudinal axis L. In some embodiments, device 200 can further include a shaft biasing element 232, such as a spring. The shaft biasing element 232 can have a first (e.g., loaded) length in the first configuration 202*a*, and a second (e.g., unloaded, resting) length in the second configuration 202*b* (FIG. 2C), such that the shaft biasing element 232 can be configured to bias the shaft 228 and the message module 212 toward the second configuration 202*b* (FIG. 2C). In the illustrated embodiment, for example, the shaft biasing element 232 is an extension spring (e.g., under tension and/or expanded relative to a resting length when in the first configuration 202*a*) positioned within the shaft slot 230 and extending between and/or coupled to the shaft end portion 228*a* and a first biasing element mount 234*a* of the body 204. As best seen in FIG. 2C, the shaft end portion 228*a* can include a second biasing element mount 234*b*. In other embodiments, the shaft biasing element 232 can be a compression spring (e.g., under compression and/or compressed relative to a resting length when in the first configuration 202*a*), and/or any other suitable biasing element.

Referring again to FIG. 2B, the actuation mechanism 210 can be configured to maintain the device 100 in the first configuration 202*a*, e.g., to maintain the shaft biasing element 232 at the first (e.g., loaded) length. The actuation mechanism 210 can include a locking or retaining element 234 ("the locking element 234"), and the shaft 228 can include an aperture or locking element receiver 236 ("the aperture 236;" best seen in FIG. 2E) sized, positioned, or otherwise configured to releasably receive at least part of the locking element 234 when the device is in the first configuration 202*a*. The interaction between the locking element 234 and the aperture 236 can restrict or maintain the shaft biasing element 232 at the first (e.g., loaded) length. When the actuation mechanism 210 is actuated, the locking element 234 can be released from the aperture 236, which can allow the shaft biasing element 232 to transition from the first length to the second length and move the shaft 228 and the message module 212 in the first direction $D_1$, as described previously and with reference to FIGS. 1A-1C. In the illustrated embodiment, the motion of the shaft 228 and the message module 212 is generally or substantially aligned (e.g., parallel or colinear) with the longitudinal axis L. In other embodiments, the motion of the shaft 228 and the message module 212 can be angled, sloped, curved, etc., relative to the longitudinal axis L.

In the illustrated embodiment, the actuation mechanism 210 further includes an actuation member 238 and an actuation pivot 240 positioned between the actuation member 238 and the locking element 234. The actuation member 238 can be pressed or pushed (e.g., toward the body 204) to pivot the locking element 234 about the actuation pivot 240 away from the body 204, e.g., to release the locking element 234 from the aperture 236 and actuate the actuation mechanism 210. In some embodiments, for example, the actuation pivot 240 can include an actuation mechanism biasing element 242 ("the mechanism biasing element 242") configured to bias the locking element 234 toward the aperture 236, e.g., to maintain the interaction between the locking element 234 and the aperture. Accordingly, pressing or pushing the actuation member 238 can counteract the biasing of the mechanism biasing element 242. In the illustrated embodiment, the mechanism biasing element 242 includes a torsion spring configured to pivotably or rotatably bias the locking element 234. Additionally, or alternatively, in other embodiments the mechanism biasing element 242 can include a tension spring, a compression spring, and/or any other suitable mechanism biasing element.

Referring to FIG. 2C, in the second configuration **202*b*, the message module 212 can extend from the chamber or opening 226 and at least partially beyond the body 204 (e.g., the first end portion 204*a* of the body 204), as described previously and with reference to FIGS. 1A and 1B. Additionally, as described previously, in the second configuration 202*b*, the arms 208 can be pivoted relative to the body 204 in the first direction $D_1$. The motion of the arms 208 can cause corresponding motion of the respective arm actuators 220. In the illustrated embodiment, for example, the arm actuators 220 can be pivoted relative to the body 204 in the second direction $D_2$ when the arms 208 pivot in the first direction $D_1$. The motion of the arms 208 and the arm actuators 220 can be controlled or governed by the coupling of the arm actuators 220. In the illustrated embodiment, for example, to pivot the arms 208 from the first configuration 202*a* to and/or toward the second configuration 202*b*, the arm actuator pin 224 can be moved in the second direction $D_2$. Because the arm actuator pin 224 is coupled to the second arm actuator 220*b* and is slidably received by the slot 222 of the first arm actuator 220*a*, the motion of the arm actuator pin 224 in the second direction $D_2$ can cause the arm actuators 220*a-b* to pivot (e.g., about the respective pivots 218*a-b*) in the second direction $D_2$, and, in response, can pivot (e.g., about the respective pivots 218*a-b*) the arms 208 in the first direction $D_1$. As described in greater detail below and with reference to FIGS. 2B and 2C, the pivoting of the arm actuators 220 in the second direction $D_2$ can correspond to the motion of the shaft 228** in the first direction $D_1$.

Referring to FIGS. 2B and 2C together, in the illustrated embodiment, the arms 208 are configured to pivot about 70 degrees between the first and second configurations **202*a-b*. In other embodiments, however, each of the arms 208 can be configured to pivot a greater or lesser angle, such as an angle between about 0 degrees and about 180 degrees, including at least 1 degree, 15 degrees, 30 degrees, 45 degrees, 90 degrees, 105 degrees, 120 degrees, 135 degrees, 150 degrees, 165 degrees, or any other suitable angle. Additionally, in the illustrated embodiment, the message module 212 is configured to move about 39.5 mm between the first and second configurations 202*a-b*. In other embodiments, the message module 212** can be configured to move a greater or lesser distance, such as a distance between about 1 mm and about 100 mm, including at least 1 mm, 10 mm, 25 mm, 50 mm, 75 mm, or any other suitable distance.

Figure 2D:
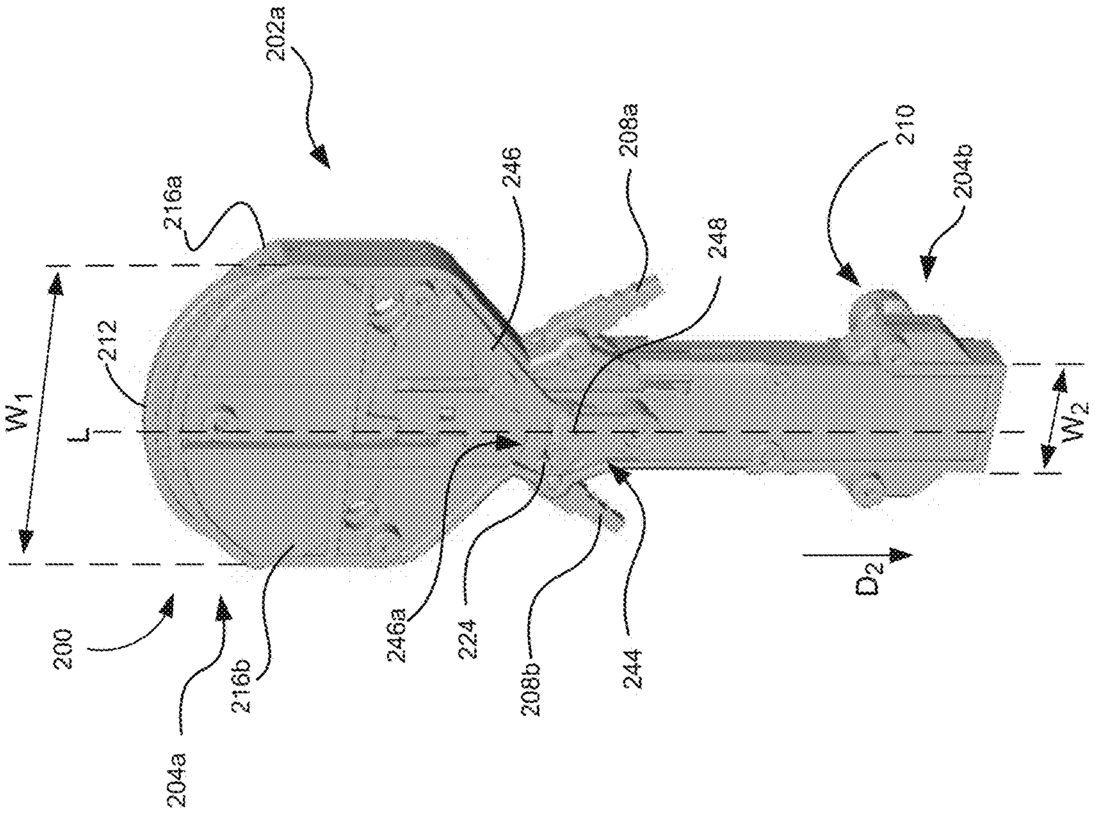
FIG. 2D illustrates a rear perspective view of the greeting device of FIG. 2A.

FIG. 2D is a rear perspective view of the device 200 of FIG. 2A in the first configuration **202*a*. As best seen in FIG. 2D, the device 200 can further include an arm actuation mechanism 244 at least partially coupled to the second plate 216*b*. The arm actuation mechanism 244 can include an arm actuation member or lever 246 ("the arm lever 246") configured to pivot about an arm actuation or lever pin 248 ("the lever pin 248"). The arm lever 246 can include a pin-coupling or pin-receiving region 246*a* ("the region 246*a*") sized, positioned, and/or otherwise configured to couple and/or receive the arm actuator pin 224, such that the motion of the arm lever 246 can drive the motion of the arm actuator pin 224. As described in greater detail below and with reference to FIGS. 2E and 2F, when the actuation mechanism 210 is actuated, the arm lever 246 can be configured to pivot to and/or toward the longitudinal axis L, e.g., to move the arm actuator pin 224** in the second direction $D_2$.

As best seen in FIG. 2D, the first end portion **204*a* of the body 204 can have a first width $W_1$ (e.g., as measured perpendicular to the longitudinal axis L), and the second end portion 204*b*** can have a second width $W_2$ (e.g., as measured perpendicular to the longitudinal axis L). In the illustrated embodiment, the first width $W_1$ is greater than the second width $W_2$. In other embodiments, however, the first width $W_1$ can be generally similar or the same as the second width $W_2$, or the second width $W_2$ can be greater than the first width $W_1$.

Figure 2F:
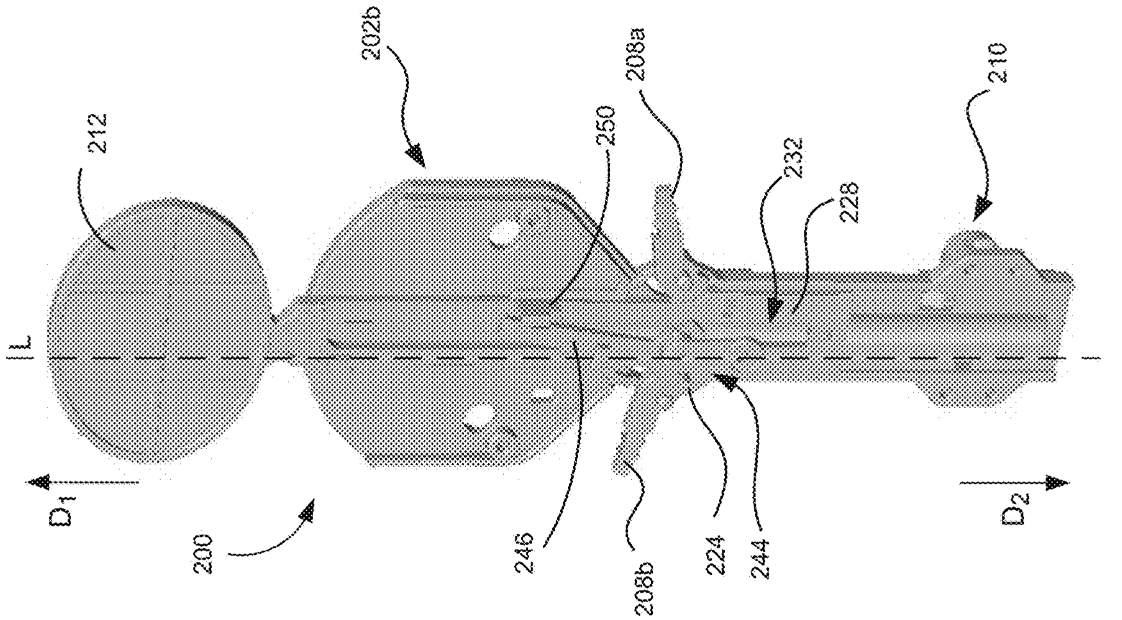
FIG. 2F illustrates a rear perspective view of the greeting device of FIG. 2E in a second configuration.
Figure 2E:
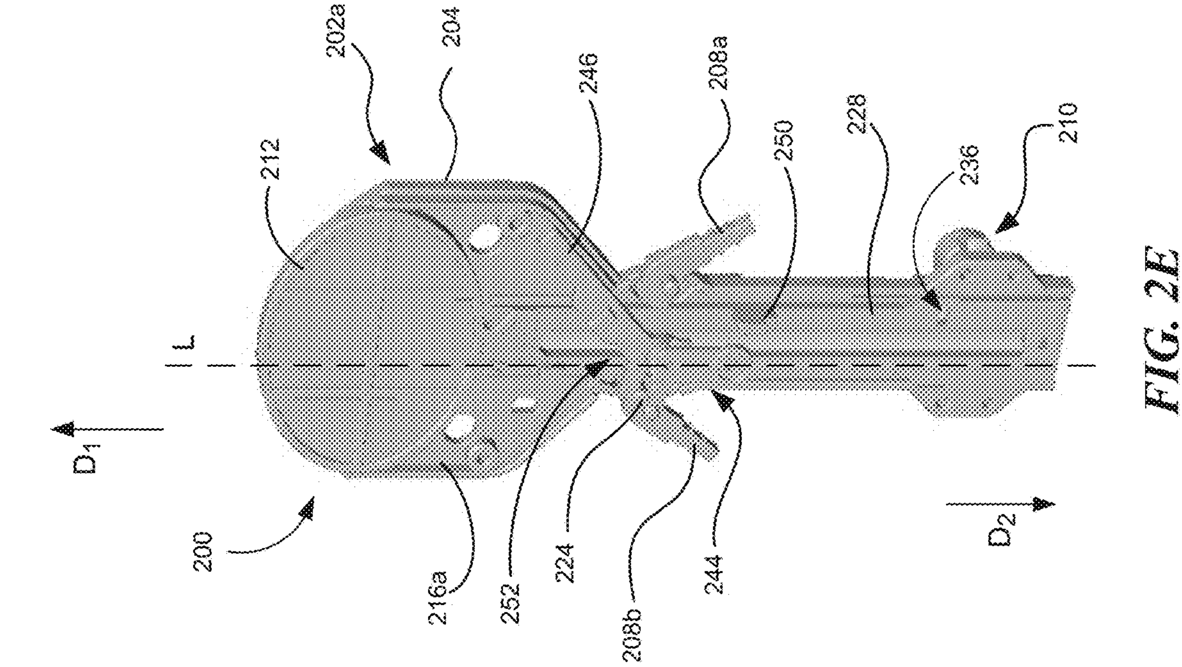
FIG. 2E illustrates a rear perspective view of select aspects of the greeting device of FIG. 2A with other aspects of the device omitted for clarity.

FIGS. 2E and 2F are rear perspective views of select aspects of the device 200 of FIG. 2A with other aspects of the device 200 omitted for clarity. In particular, FIG. 2E is a rear perspective view of the device 200 of FIG. 2A with the second plate **216*b* omitted solely for the purpose of clarity, and FIG. 2F is a front perspective view of the device 200 in a second configuration 202*b*, and again with the second plate 216*b*** omitted solely for the purpose of clarity.

Referring first to FIG. 2E, the shaft 228 can include an activation rib or tab 250 ("the tab 250") extending from the shaft 228. In the illustrated embodiment, for example, the first plate **216*a* can define a plane, and the tab 250 can extend away from and/or be generally or substantially perpendicular to the plane. In other embodiments, the tab 250 can extend from the plane at any other suitable angle. The tab 250 can be configured to contact the arm lever 246 when the actuation mechanism 210 is actuated. As described previously and with reference to FIGS. 2B and 2C, actuating the actuation mechanism 210 can cause the shaft 228 to move in the first direction $D_1$. The movement of the shaft 228 can cause the tab 250 to contact the arm lever 246, and, in response, can cause the arm lever 246 to pivot toward the longitudinal axis L. As described previously and with reference to FIG. 2D, the pivoting of the arm lever 246 can move the arm actuator pin 224 in the second direction $D_2$, and, in response, can cause the arms 208 to rotate in the first direction $D_1$ (e.g., by pivoting the arm actuators 220 of FIGS. 2A-2C** in the second direction $D_2$).

The arm actuation mechanism 244 can be biased such that the arm lever 246 is preferentially in the first configuration **202*a*, e.g., pivoted away from the longitudinal axis L. In at least some embodiments, for example, the arm actuation mechanism 244 can include an arm actuation biasing element 252 ("the arm biasing element 252") configured to bias (e.g., pivotably bias) the arm lever 246 toward the first configuration 202***a*. The arm biasing element 252 can include a torsion spring, a compression spring, a tension spring, and/or any other suitable biasing element. Additionally, or alternatively, in at least some embodiments the arm actuation mechanism 244 can be biased toward the first configuration 202*a* by gravity/a gravitational force acting on the arm lever 246.

Referring next to FIG. 2F, in the second configuration 202*b*, the tab 250 can at least partially block or prevent the arm lever 246 from pivoting away from the longitudinal axis L, e.g., toward the first configuration 202*a* (FIG. 2E). Accordingly, the shaft biasing element 232 can exert a force in the first direction $D_1$ greater than the biasing force on the arm actuation mechanism 244, e.g., a biasing force greater than gravity, and/or the shaft biasing element 232 can have a first spring constant $k_1$ greater than a second spring constant $k_2$ of the arm biasing element 252. Additionally, when the message module 212 is moved in the second direction $D_2$, e.g., to reset the actuation mechanism 210 and/or the device 200 as described previously and with reference to FIG. 1C, the tab 250 can also move in the second direction $D_2$ and allow arm lever 246 to pivot (e.g., in response to the biasing of the arm actuation mechanism 244) to and/or towards the first configuration 202*a* (FIG. 2E).

Referring to FIGS. 2E and 2F together, in the illustrated embodiment, the arm lever 246 is configured to pivot 39 degrees between the first and second configurations 202*a-b*. In other embodiments, the arm lever 246 can be configured to pivot a greater or lesser angle, such as an angle between about 0 degrees and about 180 degrees, including at least 1 degree, 15 degrees, 30 degrees, 45 degrees, 90 degrees, 105 degrees, 120 degrees, 135 degrees, 150 degrees, 165 degrees, or any other suitable angle.

FIGS. 3A-3F illustrate a greeting device 300 ("the device 300") configured in accordance with additional embodiments of the present technology. The device 300 can be generally similar to or the same as the device 100 of FIGS. 1A-1C and/or the device 200 of FIGS. 2A-2F. Accordingly, like numbers are used to indicate like components (e.g., message module 312 versus the message module 112 of FIGS. 1A-1C, the message module 212 of FIGS. 2A-2F), and the discussion of the device 300 will be limited to those aspects that differ from the device 200 of FIGS. 2A-2F and are otherwise provided for context.

Figure 3B:
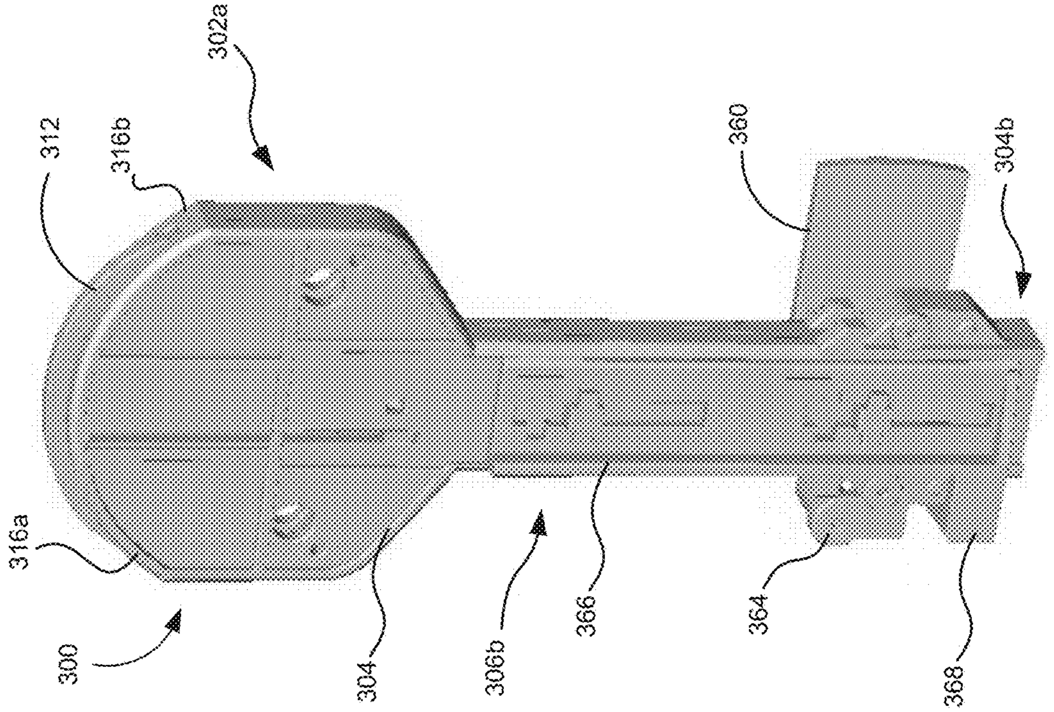
FIG. 3B illustrates a rear view of the greeting device of FIG. 3A.
Figure 3A:
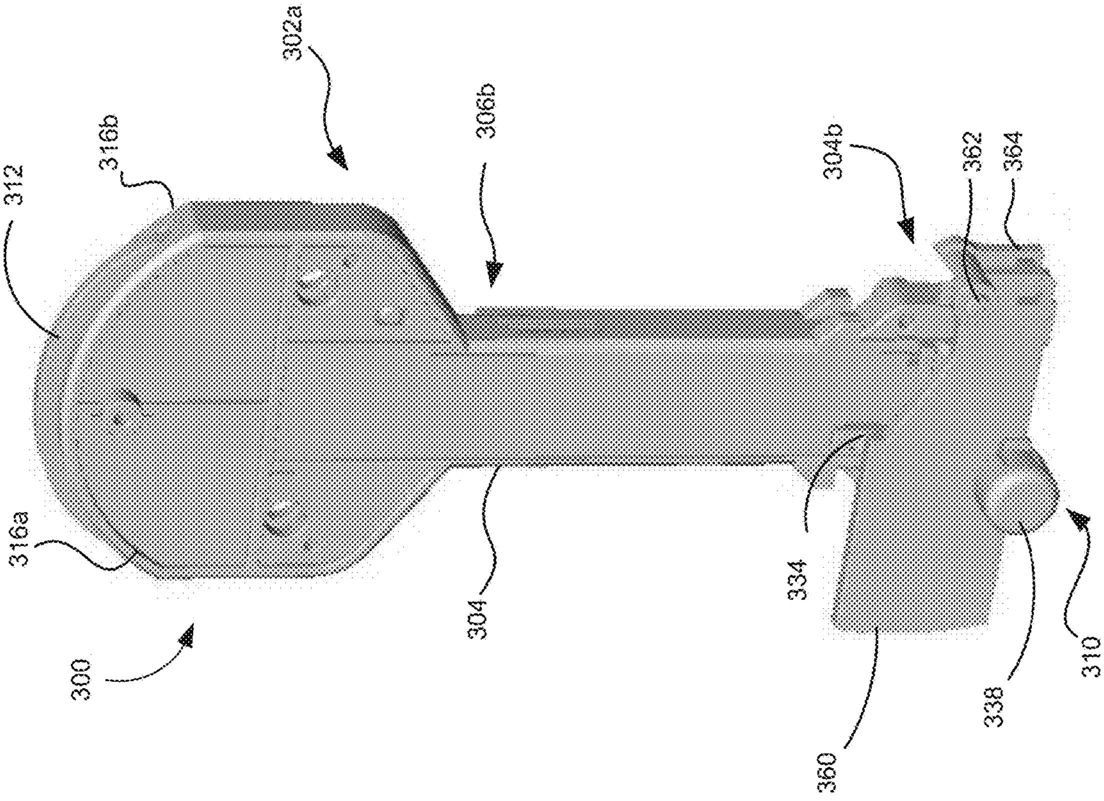
FIG. 3A illustrates a front view of a greeting device, configured in accordance with embodiments of the present technology, in a first configuration.

FIG. 3A is a front view of the device 300 in a first configuration 302*a*, and FIG. 3B is a rear view of the device 300 of FIG. 3A. Referring to FIGS. 3A and 3B together, the device 300 includes a plurality of signs or message modules. In the illustrated embodiment, for example, the device 300 includes a first message module 312 and a second or pivotable message module 360. In the illustrated embodiment, the second message module 360 is positioned proximate the second end portion 304*b* of the body 304 and at least partially between the locking element 334 and the actuation element 338. In other embodiments, however, the second message module 360 can have any other suitable position relative to the body 304 and/or one or more other aspects of the device 300.

In some embodiments, the second message module 360 can be coupled (e.g., operably, pivotably, etc.) to the body 304. In the illustrated embodiment, for example, the second message module 360 is pivotably coupled to the body 304 by a pivot 362, and the pivot 362 is coupled to the body 304 by a pivot mount 364. Referring to FIG. 3B, the device 300 can further include a slide or carriage 366 ("the slide 366") slidably or movably coupled to the body 304. The slide 366 can include a second message module or pivot actuator 368 ("the pivot actuator 368") operably coupled to the second message module 360. As described in greater detail below and with reference to FIGS. 3C-3F, when actuated, the actuation mechanism 310 can be configured to move the pivot actuator 368 to move or pivot the second message module 360 relative to the body 304.

Figure 3D:
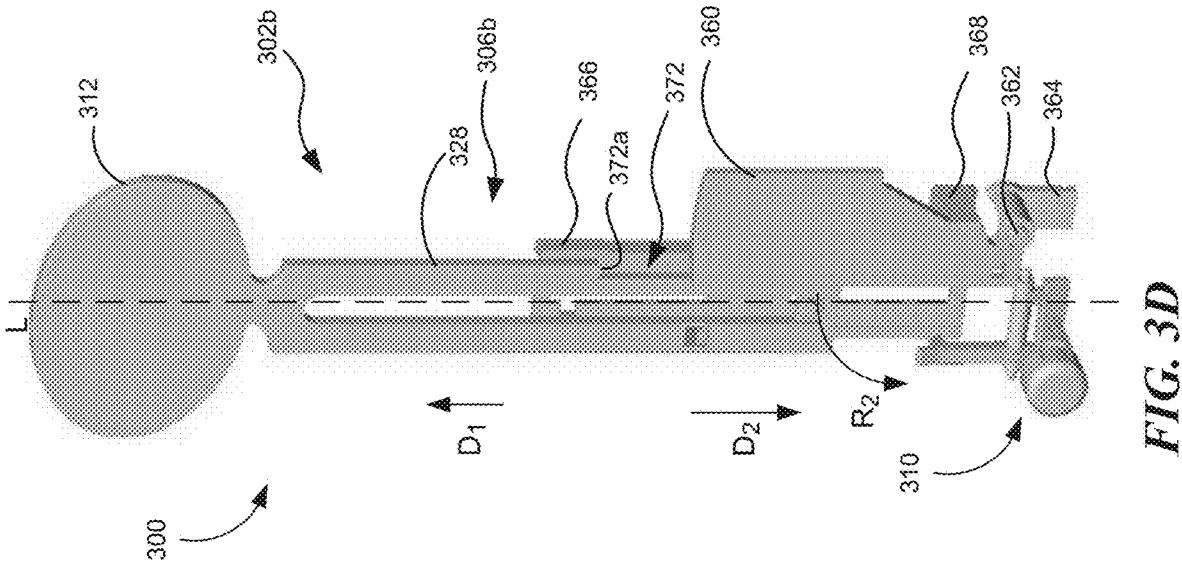
FIG. 3D illustrates a front perspective view of the greeting device of FIG. 3C in a second configuration.
Figure 3C:
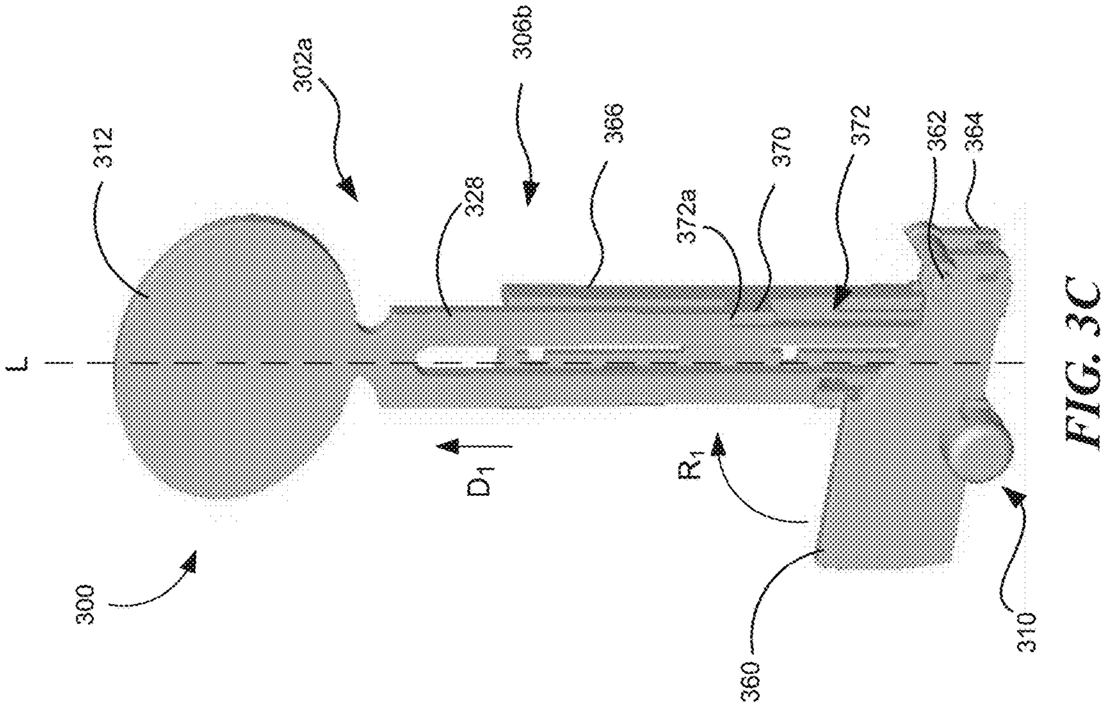
FIG. 3C illustrates a front perspective view of select aspects of the greeting device of FIG. 3A with other aspects of the greeting device omitted for clarity.

FIGS. 3C and 3D are front perspective views of select aspects of the device 300 of FIG. 3A with other aspects of the device omitted for clarity. In particular, FIG. 3C is a front perspective view of the device 300 of FIG. 3A with the first and second plates 316*a-b* omitted solely for the purpose of clarity, and FIG. 3D is a front perspective view of the device 300 of FIG. 3C in a second configuration 302*b*.

Referring first to FIG. 3C, in the illustrated embodiment, the slide 366 includes a slide tab or projection 370 ("the slide tab 370"). The slide tab 370 can be slidably received by a notch or recessed portion 372 ("the notch 372") of the shaft 328. The notch 372 can be generally or substantially aligned or parallel to the longitudinal axis L. The notch 372 can have a first (e.g., upper) end 372*a* and a second (e.g., lower) end 372*b* (best seen in FIGS. 3E and 3F) opposite the first end 372*a*. In the first configuration 302*a*, the slide tab 370 can at least partially contact the first end 372*a* of the notch 372. Accordingly, the interaction between the shaft 328 and the actuation mechanism 310 (described previously above with reference to FIGS. 2A-2F) and the interaction between the slide tab 370 and the notch 372 of the shaft 328 can at least partially or fully block or prevent the slide 366 from moving in the first direction $D_1$. In the illustrated embodiment, the slide tab 370 extends generally or substantially perpendicular from the slide 366 toward the second message module 360, and the slide tab 370 and the notch 372 are positioned proximate the second side 306*b* of the device 300. In other embodiments, the slide tab 370 and/or the notch 372 can each have any other suitable orientation and/or position relative to each other and/or the device 300.

When actuated, the actuation mechanism 310 can be configured to move or pivot the second message module 360 relative to the body 304. In the illustrated embodiment, for example, the second message module 360 is configured to pivot in a first pivot direction $R_1$ to and/or toward the longitudinal axis L and/or the second side 306*b*. Referring to FIG. 3D, when the actuation mechanism 310 is actuated, the first message module 312 and the shaft 328 can be configured to move in the first direction $D_1$, as described previously and with reference to FIGS. 2A-2F. The movement of the shaft 328 in the first direction $D_1$ can cause the second end 372*b* (best seen in FIGS. 3E and 3F) to move in the first direction $D_1$, to contact the slide tab 370, and to move the slide tab 370 and the slide 366 in the first direction $D_1$. As the slide 366 moves in the first direction $D_1$, the pivot actuator 368 can move in the first direction $D_1$ and cause the second message module 360 to pivot in the first pivot direction $R_1$ (FIG. 3C) about the pivot 362. Accordingly, the movement of the first message module 312 can be coordinated with, in concert with, and/or at least partially concurrent with the pivoting of the second message module 360.

In the illustrated embodiment, the slide 366 is configured to move a distance of about 14.2 mm in the first direction. In other embodiments, the slide 366 can be configured to move a distance between about 1 mm and about 50 mm, such as at least 1 mm, 5 mm, 10 mm, 14 mm, 15 mm, 20 mm or any other suitable distance. In the illustrated embodiment, the second message module 360 is configured to pivot an angle of about 90 degrees in the first pivot direction $R_1$. In other embodiments, the second message module 360 can pivot an angle of between about 1 degree and about 160 degrees, such as at least 1 degree, 10 degrees, 15 degrees, 30 degrees, 45 degrees, 60 degrees, 75 degrees, 90 degrees, 105 degrees, 120 degrees, 135 degrees, 150 degrees, or any other suitable angle.

To reset the device 300, e.g., as described previously above with reference to FIGS. 1C and 2F, the message module 312 can be moved in the second direction $D_2$. Moving the message module 312 in the second direction $D_2$ can move the shaft 328 in the second direction $D_2$ and bring the first end 372*a* into contact with the slide tab 370 (not shown in FIG. 3D for the purpose of clarity). The interaction between the slide tab 370 and the first end 372*a* of the notch 372 can move or drive the slide 366 and the pivot actuator 368 in the second direction $D_2$ and, accordingly, can cause the second message module 360 to pivot in a second pivot direction $R_2$ opposite the first pivot direction $R_1$, e.g., to return the device 300 to the first configuration 302*a* (FIG. 3C).

Figure 3F:
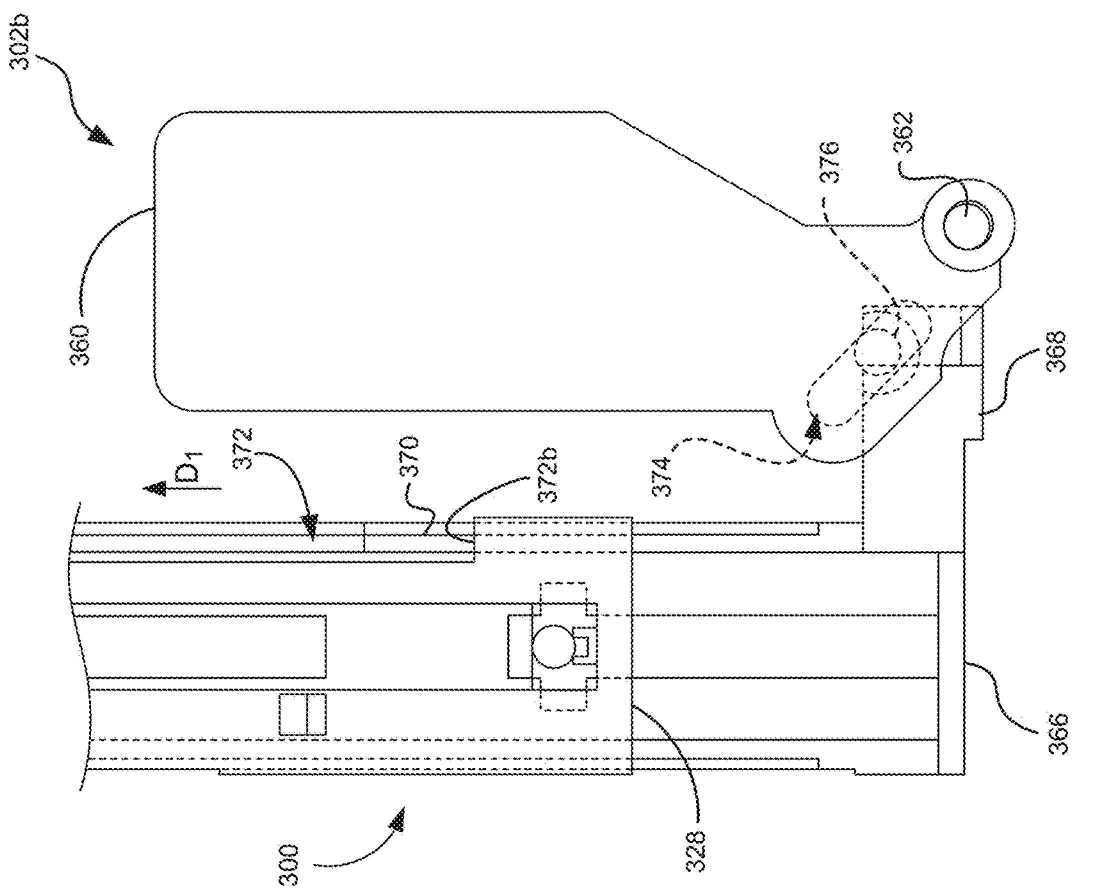
FIG. 3F illustrates a front view of the portion of the greeting device of FIG. 3E in a second configuration.
Figure 3E:
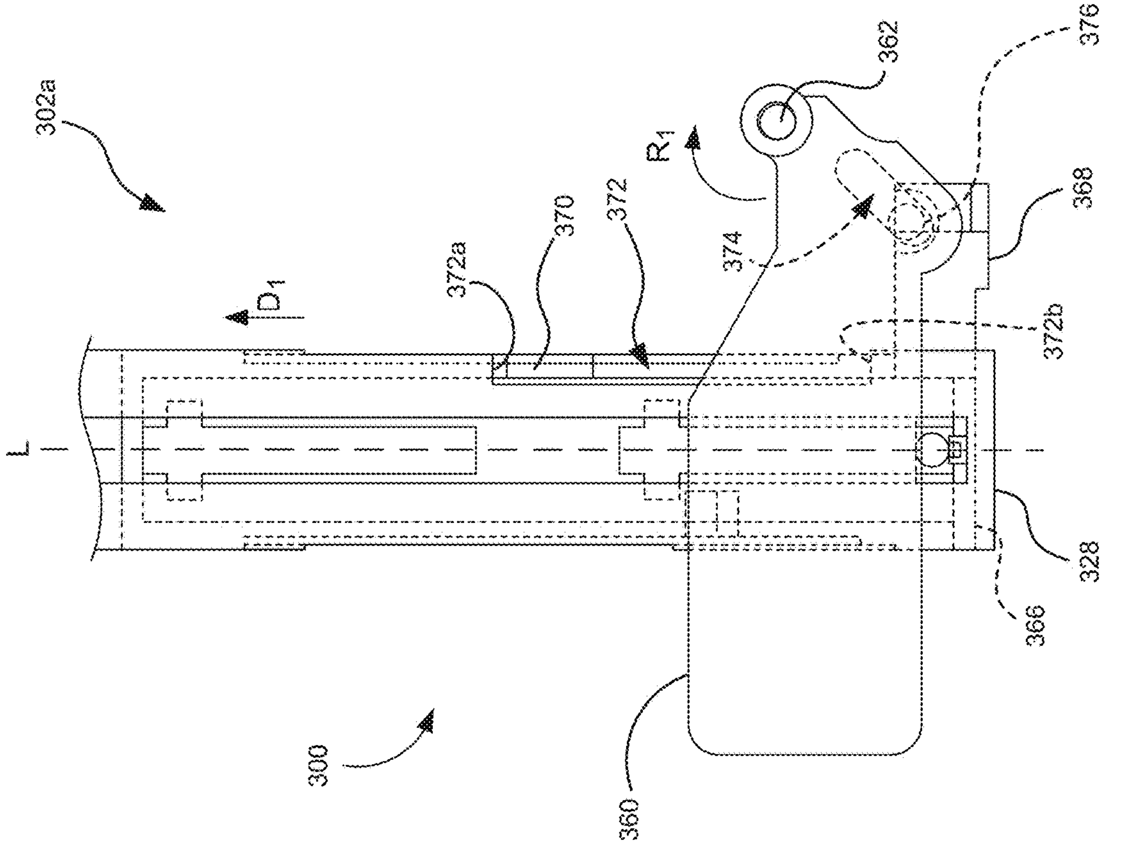
FIG. 3E illustrates an enlarged front view of a portion of the greeting device of FIG. 3C.

FIGS. 3E and 3F are enlarged front views of a portion of the device 300 of FIG. 3C. In particular, FIG. 3E is an enlarged front view of a portion of the device 300 in the first configuration 302*a*, and FIG. 3F is an enlarged front view of a portion of the device 300 in the second configuration 302*b*. Referring to FIGS. 3E and 3F together, in the illustrated embodiments, the second message module 360 includes a slot 374, and the pivot actuator 368 includes a pin or pivot 376 slidably received by the slot 374. As the shaft 328 moves in the first direction $D_1$ (e.g., in response to actuating the actuation mechanism 310 of FIGS. 3A-3D), the second end 372*b* of the notch 372 moves toward and contacts the slide tab 370, and can cause the slide 366 and the pivot actuator 368 to move in the first direction $D_1$ as described previously and with reference to FIGS. 3C and 3D. The movement of the pivot actuator 368 in the first direction $D_1$ can cause the pin 376 to move (e.g., slidably move) through and/or along the slot 374. The slot 374 can be at an angle relative to the longitudinal axis L such that the motion of the pin 376 along the slot 374 can cause the second message module 360 to rotate in the first pivot direction $R_1$.

B. CONCLUSION

The above-detailed description of embodiments of the present technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A greeting device, comprising:
- an elongate body having a first end portion and a second end portion opposite the first end portion, the first end portion at least partially defining a chamber;
- a message module positioned at least partially within the chamber;
- a first arm pivotably coupled to a first side of the body;
- a second arm pivotably coupled to a second side of the body opposite the first side; and
- an actuation mechanism operably coupled to the body, wherein, when actuated, the actuation mechanism is configured to—
  - pivot the first and second arms relative to the body in a first direction toward the message module; and
  - move the message module in the first direction from the chamber to extend at least partially beyond the body.

2. The greeting device of claim 1 wherein the first and second arms are configured to pivot a same angle in the first direction.

3. The greeting device of claim 1 wherein the first and second arms are configured to pivot in concert.

4. The greeting device of claim 1 wherein the pivoting of the first and second arms is coordinated with movement of the message module.

5. The greeting device of claim 1 wherein the message module is coupled to an elongate shaft extending toward the second end portion of the body, the elongate shaft having a shaft end portion opposite the message module.

6. The greeting device of claim 5 wherein the shaft end portion includes an aperture configured to releasably receive a locking element of the actuation mechanism.

7. The greeting device of claim 6 wherein, in a first configuration, the locking element is releasably received by the aperture, and wherein, in a second configuration, the locking element is released from the aperture.

8. The greeting device of claim 7 wherein the actuation mechanism further includes a biasing element configured to bias the locking element toward the first configuration.

9. The greeting device of claim 6 wherein, in the first configuration, the locking element at least partially prevents the message module from moving in the first direction.

10. The greeting device of claim 6 wherein, when actuated, the actuation mechanism is further configured to rotate the locking element to at least partially release the locking element from the aperture.

11. The greeting device of claim 5 wherein the elongate shaft includes a tab extending from the elongate shaft in a direction perpendicular to a plane of the body, and wherein the greeting device further comprises an arm actuation mechanism, wherein the arm actuation mechanism includes:

a first arm actuator coupled to the first arm;

a second arm actuator coupled to the second arm; and an arm lever coupled to the first and second arm actuators;

wherein, when actuated, the arm actuation mechanism is configured to— move the tab in the first direction to contact the arm lever, and pivot the arm lever toward a longitudinal axis of the body.

12. The greeting device of claim 5 wherein the elongate shaft further comprises a slot, and wherein the slot includes a biasing element coupled to the shaft end portion and configured to bias the message module toward the second configuration.

13. The greeting device of claim 12 wherein, when the actuation mechanism is actuated, the biasing element is configured to move the message module in the first direction.

14. The greeting device of claim 12 wherein, in the first configuration, the actuation mechanism at least partially prevents the biasing element from moving the message module in the first direction.

15. The greeting device of claim 1 wherein the first end portion has a first width relative to a longitudinal axis of the body, and the second end portion has a second width relative to the longitudinal axis.

16. The greeting device of claim 15 wherein the first width is greater than the second width.

17. A message display device transitionable between a first configuration and a second configuration, the message display device comprising:

an elongate body including:

a first end portion and a second end portion opposite the first end portion, and a chamber at the first end portion and defined, at least in part, by the body;

a message module wherein, in the first configuration, the message module is positioned at least partially within the chamber;

a first arm pivotably coupled to a first side of the body;

a second arm pivotably coupled to a second side of the body opposite the first side; and an actuation mechanism coupled to the second end portion and that, when actuated, is configured to transition the message display device from the first configuration to the second configuration, wherein, when the actuation mechanism is actuated— the first arm is configured to pivot relative to the body in a first direction toward the first end portion, the second arm is configured to pivot in the first direction, and the message module is configured to move in the first direction to extend from the chamber and at least partially beyond the first end portion.

18. The message display device of claim 17 wherein the first and second arms are configured to pivot a same angle in the first direction.

19. The message display device of claim 17 wherein the pivoting of the first and second arms is in concert with movement of the message module.

20. The message display device of claim 17 wherein:

the message module is coupled to an elongate shaft extending toward the second end portion of the body, wherein the elongate shaft includes a shaft end portion opposite the message module, and a tab extending from the shaft in a direction perpendicular to a plane of the body; and the message display device further comprises an arm actuation mechanism, wherein the arm actuation mechanism includes— a first arm actuator coupled to the first arm;

a second arm actuator coupled to the second arm; and an arm lever coupled to the first and second arm actuators, wherein, when the message display device transitions from the first configuration to the second configuration— the tab is configured to move in the first direction and contact the arm lever, the movement of the tab causes the arm lever to pivot, the pivoting of the arm lever causes the first and second arm actuators to pivot in a second direction opposite the first direction, and the pivoting of the first and second arm actuators causes the first and second arms to pivot in the first direction.

* * * * *